(12) United States Patent
Maraj et al.

(10) Patent No.: US 12,161,524 B2
(45) Date of Patent: *Dec. 10, 2024

(54) SYSTEMS AND METHODS FOR DENTAL TREATMENT UTILIZING MIXED REALITY AND DEEP LEARNING

(71) Applicants: Baliram Maraj, Farmington, CT (US); Darshanand Khusial, Mississauga (CA)

(72) Inventors: Baliram Maraj, Farmington, CT (US); Darshanand Khusial, Mississauga (CA)

( * ) Notice: Subject to any disclaimer, the term of this patent is extended or adjusted under 35 U.S.C. 154(b) by 899 days.

This patent is subject to a terminal disclaimer.

(21) Appl. No.: 16/850,373

(22) Filed: Apr. 16, 2020

(65) Prior Publication Data
US 2020/0237476 A1 Jul. 30, 2020

Related U.S. Application Data

(63) Continuation of application No. 15/788,910, filed on Oct. 20, 2017, now Pat. No. 10,660,728.
(Continued)

(51) Int. Cl.
*A61C 7/00* (2006.01)
*A61C 9/00* (2006.01)
(Continued)

(52) U.S. Cl.
CPC ............ *A61C 7/002* (2013.01); *A61C 9/0046* (2013.01); *A61C 13/0004* (2013.01);
(Continued)

(58) Field of Classification Search
CPC .. A61C 5/77; A61C 7/002; A61C 7/08; A61C 7/12; A61C 9/0046; A61C 13/0004;
(Continued)

(56) References Cited

U.S. PATENT DOCUMENTS

8,487,962 B2 * 7/2013 Quadling ............... G16H 30/40
345/632
9,579,171 B2 * 2/2017 Lorünser ............ A61C 13/0004
(Continued)

*Primary Examiner* — Matthew M Nelson
(74) *Attorney, Agent, or Firm* — Barclay Damon LLC; Anthony P. Gangemi (57) ABSTRACT

Methods and systems of the present disclosure are directed to providing dental treatment utilizing a mixed reality device. A patient's physical arch is scanned to produce a virtual arch that is then rendered in a computing environment for analysis and manipulation. Virtual targets, e.g., brackets, implants, etc., and/or a grid, are applied to the virtual arch to produce a virtual dental treatment template. The virtual dental treatment template is rendered in the mixed reality device and aligned the template with the physical arch of the patient in the mixed reality device. A practitioner is thus provided with this template and the patient within the same field of view, so that installation of dental apparatus can be simply a matter of aligning physical dental apparatus with the corresponding virtual dental apparatus. Positioning of the virtual target on the virtual arch and/or alignment of the virtual dental treatment template on the physical arch can be performed automatically via deep learning, Support Vector Machines, Decision Trees, etc. with the relevant data sets.

19 Claims, 11 Drawing Sheets

Related U.S. Application Data (60) Provisional application No. 62/410,603, filed on Oct. 20, 2016.

(51) Int. Cl.
|  |  |
|---|---|
| *A61C 13/00* | (2006.01) |
| *G06T 19/00* | (2011.01) |
| *G06T 19/20* | (2011.01) |
| *A61C 5/77* | (2017.01) |
| *A61C 7/08* | (2006.01) |
| *A61C 7/12* | (2006.01) |
| *A61C 13/08* | (2006.01) |
| *G06N 3/08* | (2023.01) |
| *G06T 7/00* | (2017.01) |
| *G06T 7/20* | (2017.01) |
| *G06T 7/70* | (2017.01) |

(52) U.S. Cl.
CPC ............ *G06T 19/006* (2013.01); *G06T 19/20* (2013.01); *A61C 5/77* (2017.02); *A61C 2007/004* (2013.01); *A61C 7/08* (2013.01); *A61C 7/12* (2013.01); *A61C 13/08* (2013.01); *G06N 3/08* (2013.01); *G06T 7/0012* (2013.01); *G06T 7/20* (2013.01); *G06T 7/70* (2017.01); *G06T 2207/20076* (2013.01); *G06T 2207/20081* (2013.01); *G06T 2207/30036* (2013.01); *G06T 2210/41* (2013.01)

(58) Field of Classification Search
CPC .... A61C 13/08; A61C 2007/004; G06N 3/08; G06T 7/0012; G06T 7/20; G06T 7/70; G06T 19/006; G06T 19/20; G06T 2207/20076; G06T 2207/20081; G06T 2207/30036; G06T 2210/41
USPC ........................................................ 433/8–24
See application file for complete search history.

(56) References Cited

U.S. PATENT DOCUMENTS

| | | | |
|---|---|---|---|
| 10,166,091 B2 * | 1/2019 | Cowburn | A61C 19/04 |
| 10,222,619 B2 * | 3/2019 | Yu | A61B 90/50 |
| 2007/0211081 A1 * | 9/2007 | Quadling | A61C 13/0004 |
| | | | 345/632 |
| 2009/0305204 A1 * | 12/2009 | Connolly | G09B 7/02 |
| | | | 434/219 |
| 2014/0310595 A1 * | 10/2014 | Acharya | G06F 3/011 |
| | | | 715/706 |
| 2015/0238288 A1 * | 8/2015 | Lorunser | A61C 13/0019 |
| | | | 432/51 |
| 2015/0296184 A1 * | 10/2015 | Lindenberg | H04N 7/18 |
| | | | 348/77 |
| 2015/0350517 A1 * | 12/2015 | Duret | G02B 27/0176 |
| | | | 348/66 |
| 2016/0128624 A1 * | 5/2016 | Matt | A61B 5/0205 |
| | | | 600/301 |
| 2016/0220105 A1 * | 8/2016 | Duret | H04N 23/56 |
| 2016/0228212 A1 * | 8/2016 | Salah | A61B 5/0013 |
| 2017/0065379 A1 * | 3/2017 | Cowburn | A61C 13/0004 |
| 2017/0273549 A1 * | 9/2017 | Nazareth | A61B 1/06 |
| 2018/0098620 A1 * | 4/2018 | Lee | A61C 17/3481 |
| 2018/0204332 A1 * | 7/2018 | Salah | G06V 10/7515 |
| 2018/0235739 A1 * | 8/2018 | Jahn | A61C 13/0004 |
| 2019/0099236 A1 * | 4/2019 | Jin | A61B 90/16 |
| 2019/0231493 A1 * | 8/2019 | Inglese | A61C 13/0004 |

* cited by examiner

SYSTEMS AND METHODS FOR DENTAL TREATMENT UTILIZING MIXED REALITY AND DEEP LEARNING

CROSS REFERENCE TO RELATED APPLICATION(S)

This application is a continuation of U.S. Utility patent application Ser. No. 15/788,910, filed Oct. 20, 2017, which claims the benefit of U.S. Provisional Application No. 62/410,603, filed Oct. 20, 2016, which are incorporated by reference as if disclosed herein in their entireties.

BACKGROUND

The majority of orthodontic treatment involves the movement of malpositioned teeth to desired positions within a patient's mouth. One common orthodontic treatment includes affixing small, slotted appliances, referred to as brackets, to the surface of a patient's teeth and then placing and securing an archwire in the bracket slots. The archwire is under tension, thus applying a force via the brackets to the teeth causing the teeth to shift positions. To ensure the teeth move in the desired manner, the brackets must be accurately positioned. For example, if a bracket is located too near the incisal or occlusal surface of a tooth relative to the adjacent brackets, the final position of that tooth can be unduly intruded, while if the bracket is located too near the gingival surface relative to the adjacent brackets, the final position of that tooth can be unduly extruded. While orthodontists are skilled with accurately placing the brackets, naked-eye placement tends to be limited to an accuracy of about +/−0.5 millimeters.

Complicating the positioning of the brackets is tooth visibility and accessibility. When teeth are severely crowded, accessing a tooth surface can be difficult. Further, loss of accessibility increases with each subsequent posterior tooth. Another problem is time, as the longer a patient sits in the dental chair, the more restless the patient can become which can negatively affect bracket placement accuracy.

There are many commonly available brackets. A combination of brackets is used for treatment, with different types of brackets for different teeth and for different treatment objectives. Furthermore, each orthodontist may have a preferred bracket prescription.

Traditionally, in order to install brackets on a patient's dental arch, measurements are taken of each tooth to determine the correct position for each bracket. Typically, these measurements are a naked eye approximation by the practitioner, via a measuring tool, or an external software program. The practitioner then manually places the brackets specifically for each tooth. Once the brackets are fixed in position, an archwire is run through the slots in the brackets and secured in place with elastomeric or metal ties or self-ligating bracket latches. Ideally, bracket locations do not change during treatment, however the archwires could be changed or adjusted, e.g., bent, as needed throughout treatment.

A solution to lengthy placement time and imprecise manual bracket placement involves indirect bonding. Indirect bonding utilizes a dental impression or scan of the patient's dental arches to replicate a patient's dentition. A plurality of brackets are positioned as desired on the replicated dentition. A dental template, which is a replication of the patient's arch that can be overlaid on the patient's physical arch, is fabricated with the bracket locations so that when the dental templates with the brackets engages the patient's dental arch, the brackets are properly aligned at the desired location on the desired teeth.

SUMMARY

In some embodiments, the present disclosure is directed to a system for providing dental treatment including a mixed reality device. As used herein, the term "dental treatment" can refer to any dental procedure where virtual display of a guide can be useful to a practitioner, e.g., dental apparatus fabrication, dental apparatus installation, orthognathic surgery, etc. In some embodiments, the system includes a non-transitory computer storage media coupled with a computing device and encoded with one or more computer programs for producing a virtual dental treatment template and applying the virtual dental treatment template to a physical arch. The virtual dental treatment template is rendered in the mixed reality device to provide a visual guide for a practitioner as they preview and/or install a physical dental apparatus as part of a patient's dental treatment.

In some embodiments, the system includes software for scanning a physical arch to produce a virtual arch. The virtual arch is then rendered in a computing environment for analysis and manipulation. In some embodiments, the patient's entire physical arch is rendered in the computing environment. In some embodiments, a target portion of the patient's physical arch is rendered in the computing environment, e.g., the rendering is limited to a single tooth, series of teeth, and/or associated anatomical structures relevant to treatment. In some embodiments, the system includes software for positioning a virtual target on the virtual arch to produce a virtual dental treatment template. In some embodiments, the virtual target includes a dental apparatus, e.g., a bracket, implant, reconstructed tooth, replacement tooth, alignment tray, etc.; a grid; or a combination thereof. In some embodiments, the positioning of the virtual target on the virtual arch is performed by Artificial Intelligence training (via deep learning, i.e., neural networks, Support Vector Machines, Decisions Trees, etc.) the system to recognize the optimal location, shape, color, etc. for the virtual target, e.g., clear versus metal brackets, various colors of elastomeric ties, alignment trays, crowns, restored teeth, replacement teeth, reconstructed teeth, alveolar ridge augmentations, etc., or a combination thereof. In some embodiments, the positioning of the virtual target is performed by working backwards from a post-treatment location.

In some embodiments, the system includes software for rendering the virtual dental treatment template in the mixed reality device and aligning the template with the physical arch of the patient when viewed through the mixed reality device. In some embodiments, the system includes software for maintaining the alignment between the virtual dental treatment template and the physical arch in the mixed reality device. The practitioner can then use the mixed reality device to view the virtual dental treatment template and the practitioner's own installation of corresponding physical dental apparatus in real-time. In some embodiments, the system includes software for identifying an alignment between a physical dental apparatus and the virtual dental apparatus.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DESCRIPTION

Figure 1A:
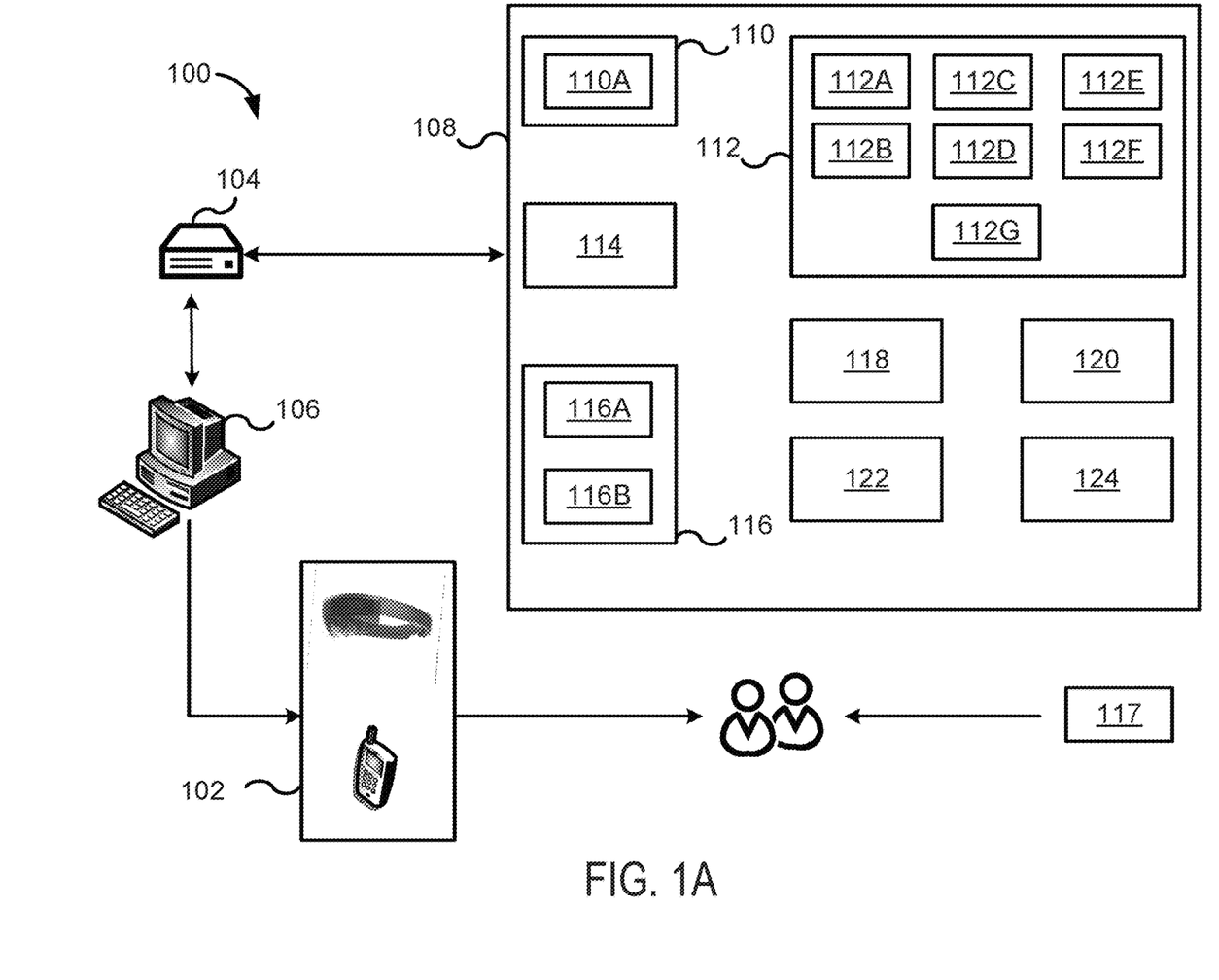
FIG. 1A is a schematic drawing of a system for providing dental treatment according to some embodiments of the present disclosure.
Figure 1B:
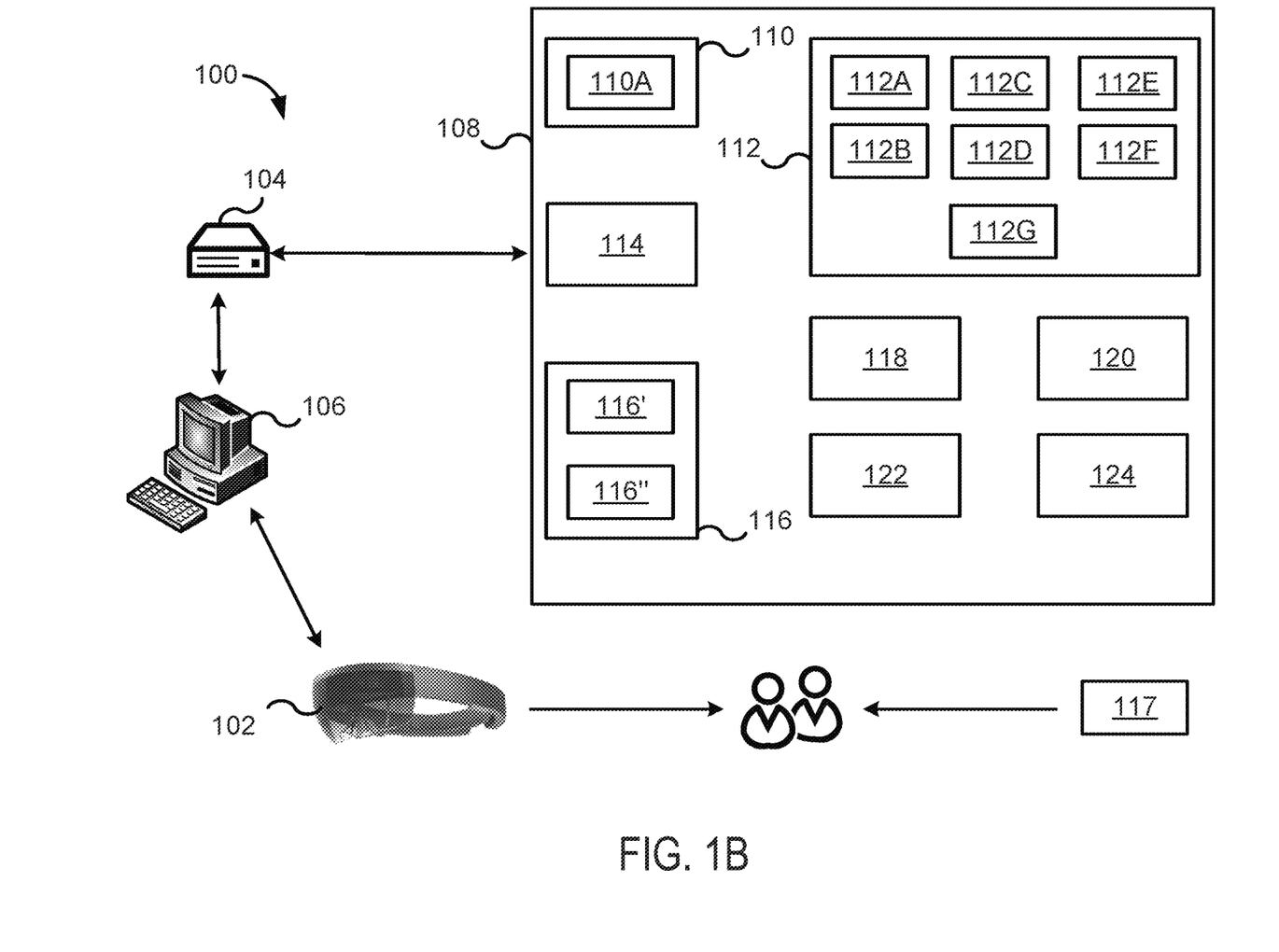
FIG. 1B is a schematic drawing of a system for providing dental treatment according to some embodiments of the present disclosure.

Referring now to FIGS. 1A-1B, aspects of the disclosed subject matter include a system 100 for providing dental treatment to a patient. In some embodiments, system 100 includes a mixed reality device 102. In some embodiments, mixed reality device 102 is a headset. In some embodiments, mixed reality device 102 is a smartphone, tablet computer, PDA, etc. As used herein, the term "mixed reality" is used to refer to each of mixed reality and augmented reality. Further, those having skill in the art would understand that the systems and methods of the present disclosure could also be implemented utilizing virtual reality systems and methods as well. In some embodiments, mixed reality device 102 is a Hololens™ (Microsoft Corporation, Redmond, WA) or third-party derivative thereof. In some embodiments, mixed reality device 102 is a Magic Leap™ (Magic Leap, Inc., Dania Beach, FL). In some embodiments, mixed reality device 102 is a Meta™ (Meta Company, Redwood Shores, CA). In some embodiments, mixed reality device 102 is Project Alloy™ (Intel Corporation, Santa Clara, CA). In some embodiments, mixed reality device 102 is ODG R9 and ODG R8. In some embodiments, mixed reality device 102 is a device from Apple, Inc., e.g., iPhone, iPad, etc., capable of running ARKit™. In some embodiments, mixed reality device 102 is an Android® device (Google Inc., Mountain View, CA) capable of running ARCore™.

Figure 2:
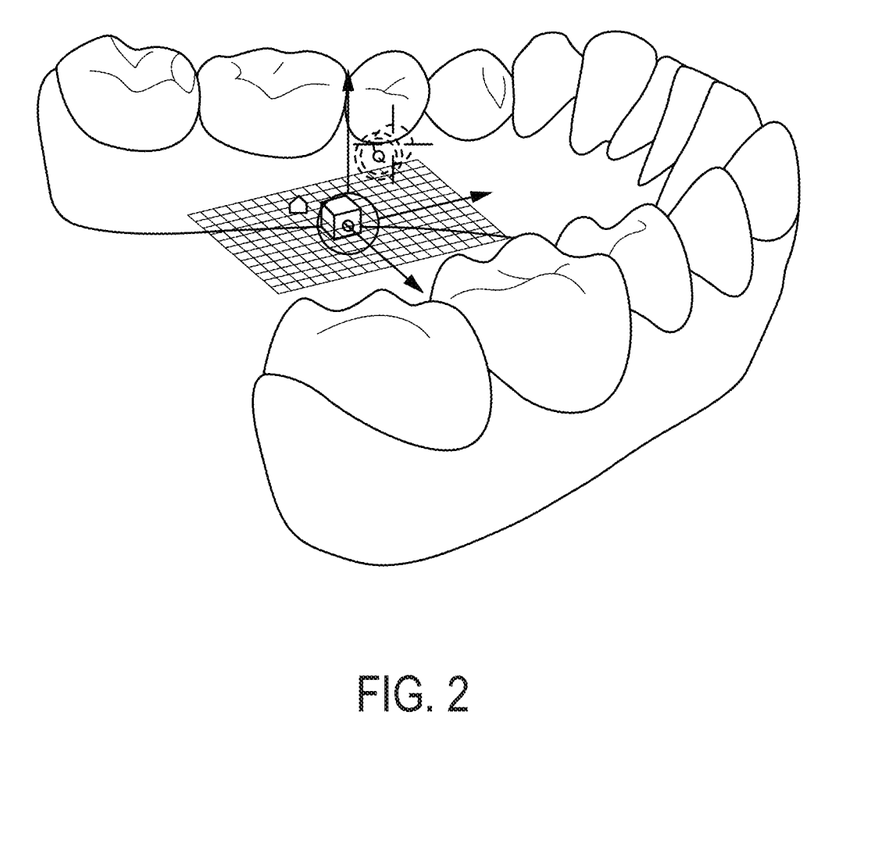
FIG. 2 is an image of a virtual arch according to some embodiments of the present disclosure.

In some embodiments, system 100 includes a non-transitory computer storage media 104 coupled with a computing device 106 and encoded with one or more computer programs 108 for producing a virtual dental treatment template and applying the virtual dental treatment template to a physical arch. In some embodiments, computing device 106 includes a desktop computer, laptop computer, tablet computer, smartphone, PDA, cloud service, headset, etc. In some embodiments, computer programs 108 include software 110 for scanning a physical arch to produce a virtual arch. Referring now to FIG. 2, the scan provides a virtual representation of the patient's physical arch in an environment for virtual manipulation, as will be discussed in greater detail below. In some embodiments, the patient's entire physical arch is scanned. In some embodiments, a target portion of the patient's physical arch is scanned, e.g., the scan is limited to a single tooth, series of teeth, and/or associated anatomical structures relevant to treatment. In some embodiments, computer programs 108 include software 110A for scanning a patient's face. In some embodiments, system 100 includes a scanning/imaging device 111. As used herein, the terms "scanning" and "imaging" are used interchangeably to refer to processes of producing a virtual arch for use in system 100, as is discussed in greater detail below. In some embodiments, the physical arch/face scans are performed by any suitable scanning process and scanning device 111. In some embodiments, scanning device 111 is a 3D scanner, e.g., an iTero® (Align Technology, Inc., San Jose, CA), True Definition Scanner™ (3M Company, St. Paul, MN), a scanner from Carestream Dental, Atlanta, GA, 3D Imaging by Dentsply Sirona, York, PA, 3D Imaging Systems by Vatech, Korea, or 3D Imaging by Planmeca, Finland, or combinations thereof. In some embodiments, the format of the scan is any suitable format, e.g., Digital Imaging and Communications in Medicine (DICOM), STL, FBX, Blender, or Adobe® Maya.

Figure 3:
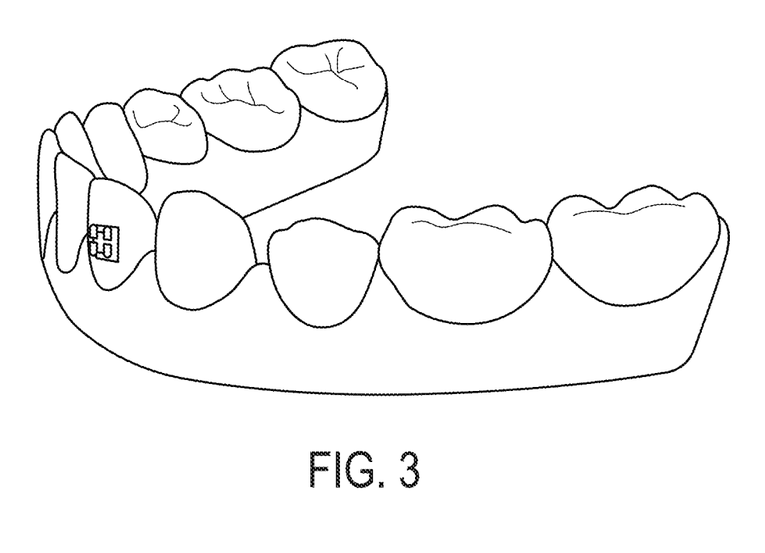
FIG. 3 is an image of a virtual arch according to some embodiments of the present disclosure.

Referring again to FIGS. 1A-1B, in some embodiments, computer programs 108 include software 112 for positioning a virtual target on the virtual arch to produce a virtual dental treatment template. Referring to FIG. 3 as an example, the virtual dental treatment template is the blueprint for the practitioner, portraying the relevant dental apparatus at locations on the virtual arch to facilitate a desired treatment outcome. In some embodiments, virtual dental treatment template production software 112 is any development environment suitable for use with the above-identified devices. In some embodiments, virtual dental treatment template production software 112 is Unity™ (Unity Technologies, San Francisco, CA); Unreal® (Epic Games, Inc., Cary, NC); Rage™ (Take-Two Interactive Software, Inc., New York, NY); CryEngine® (Crytek GMBH, Frankfurt am Main, DE); Havok® (Telekinesys Research Ltd. Co., Dublin, IE); HeroEngine® (Idea Fabrik Plc, Germantown, MD); ShiVa3D™ (ShiVa Technologies SAS, Grasse FR); Project Anarchy™ (Telekinesys Research Ltd. Co., Dublin, IE); GameMaker® (Yoyo Games Ltd., UK), GameSalad® (GameSalad Inc., Austin TX), ARKit™ (Apple Inc., Cupertino, CA), or a combination thereof. In some embodiments, the virtual target is a virtual dental apparatus, a grid, or a combination thereof. In some embodiments, the virtual dental apparatus includes a bracket, implant, reconstructed tooth, replacement tooth, restored tooth, alveolar ridge augmentation, alignment tray, or a combination thereof. In some embodiments, a grid is projected onto the respective arch to guide the practitioner in placing brackets precisely on a tooth. The virtual image (AR image)/hologram is produced by taking the intraoral scan of the arch and then placing it in an application environment where distance is calculated from the incisal or cusp tip of the tooth. A grid is then created with the practitioner choosing the distance between grid points. This grid can then be aligned with the guide in the mouth to aid the practitioner in precisely positioning the virtual grid onto the real arch.

Referring again to FIGS. 1A-1B, in some embodiments, virtual dental treatment template production software 112 includes software 112A for training system 100 with a movement training data set to identify expected translational, rotational, or tipping motion of a tooth associated with positioning of the virtual dental apparatus. In some embodiments, virtual dental treatment template production software 112 includes software 112B for identifying a location on the virtual arch for a virtual dental apparatus to achieve a final position for the tooth. In some embodiments, the movement training data set includes separate data sets for arches, incisors, cuspids, bicuspids, and molars. In some embodiments, physical arches are scanned at regular intervals to identify actual movement of teeth by physical dental apparatus relative to the last scan. By knowing the positioning of the physical dental apparatus, the actual effect of the physical dental apparatus on the teeth is determined by comparison of these scans. Further, the actual position of the teeth can be compared with the predicted position of the teeth, to vet the accuracy of software 112A/112B and refine software 112A/112B and the movement training data set.

In some embodiments, virtual dental treatment template production software 112 includes software 112C for adjusting teeth in the virtual arch to a final position. As used herein, the "final position" can mean positioning consistent with pre-treatment end-goals, e.g., for aesthetics or occlusion. In some embodiments, the "final position" means positioning consistent with an intermediate goal, e.g., a first phase of dental treatment designed to prepare the patient for a subsequent phase of dental treatment. In some embodiments, virtual dental treatment template production software 112 includes software 112D for estimating a location of the virtual target on the tooth at this final position. In some embodiments, virtual dental treatment template production software 112 includes software 112E for positioning the virtual target on the virtual arch at this location. In some embodiments, virtual dental treatment template production software 112 includes software 112F for manually adjusting the location of the virtual target. In some embodiments, virtual dental treatment template production software 112 includes software 112G for applying a virtual wire through brackets on the virtual arch to confirm proper bracket positioning. In some embodiments, software 112 takes into account collision detection between adjacent teeth or dental apparatus.

In some embodiments, force (F) produces a linear movement (translation), a rotational movement, or a combination of both of a tooth. Rotational tendency of a tooth is called a moment (M). In some embodiments, the moment to force ratio (M/F) along with the center of resistance of a tooth and force application at the bracket is used to calculate individual tooth movement. Types of tooth movement include translation (M/F=10/1 for an incisor), controlled tipping (M/F=5/1 for an incisor), uncontrolled tipping (M/F=0/1 for an incisor), root movement (M/F=12/1 for an incisor), intrusion, and extrusion. In some embodiments, the force vector on a tooth is influenced by wire parameters such as wire material, length, cross-section and configuration. In some embodiments, the force vector on a tooth is influenced by bracket prescription, interbracket distance, and position of adjacent and opposing teeth.

As discussed above, in some embodiments, alignment identifying software 112 compares predicted tooth/teeth alignment and occlusion to actual alignment and occlusion, e.g., when a wire is unloaded or passive in bracket slots. In some embodiments, the positional comparison is included in the movement training data set and training of system 100 by software 112A, improving future virtual dental apparatus positioning and sequencing. As more comparisons of predicted and actual alignment and occlusion are added to the movement training data set, system 100 can more reliably identify where the system's expected motion of a tooth or teeth is either too conservative or aggressive, and revise future virtual dental treatment templates and sequences of virtual dental treatment templates for more efficient treatment outcomes. In some embodiments, if a predicted alignment and/or occlusion greatly differ from the actual alignment and/or occlusion, the current teeth positions can be re-scanned and the alignment and occlusion virtually refined. In some embodiments, movements and the associated distortions of archwires can be rendered in mixed reality device 102 (as discussed in detail below) and can be used as a guide to place bends in the wires and/or reposition brackets. In some embodiments, the scanned arches in the finishing or detailing phase of dental treatment are used to produce alignment trays, e.g., to complete finishing for those patients that insist on having braces off early for proms, group photos, weddings, job interviews, etc. In some embodiments, the movement data used for other dental apparatus, such as brackets, is used for alignment trays. In some embodiments, in dental treatment where alignment trays are used exclusively, the physical arches are scanned and the teeth moved virtually in similar increments and sequence as they would be with braces/fixed appliances. As discussed above, comparisons between predicted tooth/teeth alignment and occlusion to actual alignment and occlusion train and improve system 100 with each case, such that if a previous case produced an alignment tray resulting in motion of a tooth or teeth that was too conservative or too aggressive, alignment trays in similar future cases would be less so. The ultimate result is the increased efficiency of each tray and increased likelihood of realizing pre-treatment goals utilizing alignment trays. In some embodiments, for patients with missing or otherwise aesthetically compromised teeth, the virtual arch is used to virtually add missing aesthetic restorations or an entire tooth (teeth), simulating a replaced tooth (teeth) or aesthetic restoration during dental treatment, that will be added during or post dental treatment. In some embodiments, for patients with missing or otherwise aesthetically compromised teeth that opt for alignment tray treatment, the virtual arch is used to virtually add missing aesthetic restorations or an entire tooth (teeth) to the facial surface of the aligner trays, simulating a replaced tooth (teeth) or aesthetic restoration during dental treatment with alignment trays, that will be added post dental treatment. In some embodiments, the simulated shade and shape of the restoration or tooth (teeth) are used to fabricate the final dental apparatus.

Figure 4:
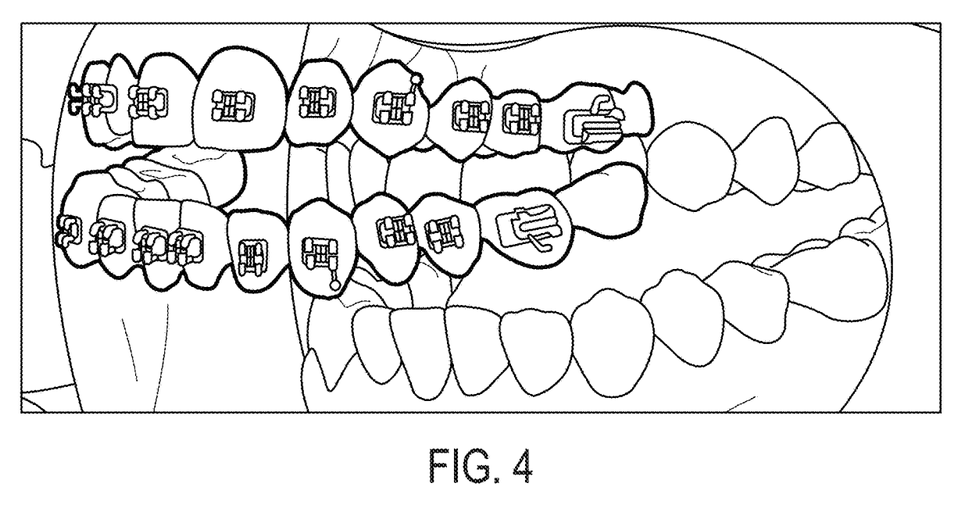
FIG. 4 is an image of a virtual arch rendered in a mixed reality environment according to some embodiments of the present disclosure.

Referring again to FIGS. 1A-1B, in some embodiments, computer programs 108 include software 114 for rendering the virtual dental treatment template in mixed reality device 102. As will be discussed is greater detail below, by rendering the virtual dental treatment template within a mixed reality device worn or held by a practitioner, a clear blueprint of the work to be performed is conveniently presented within the same field of view that includes the patient and/or the physical dental apparatus to be produced or installed for the patient, and the need for cumbersome physical guides (that would need to be custom made, often at a high monetary and time cost) is eliminated. Referring now to FIG. 4, an exemplary rendering of a virtual dental treatment template in a mixed reality environment of mixed reality device 102 is presented. In some embodiments, the virtual dental treatment template is movable within the mixed reality environment. In some embodiments, the virtual dental treatment template is rotatable within the mixed reality environment. In some embodiments, the virtual dental treatment template is tiltable within the mixed reality environment. In some embodiments, the virtual dental treatment template is rendered opaque. In some embodiments, the virtual dental treatment template is rendered translucent. In some embodiments, the practitioner can zoom in and out to magnify the field of view including the virtual dental treatment template. In some embodiments, the virtual dental treatment template as rendered in the mixed reality device includes a fully rendered virtual arch. In some embodiments, the virtual dental treatment template as rendered in the mixed reality device includes a partially rendered virtual arch. In some embodiments, the virtual dental treatment template as rendered in the mixed reality device includes all virtual dental apparatus. In some embodiments, the virtual dental treatment template is rendered incrementally, e.g., once a first physical dental apparatus is aligned with a first rendered virtual dental apparatus, the first rendered virtual dental apparatus is no longer rendered and a subsequent virtual dental apparatus is rendered. In some embodiments, the virtual dental treatment template can be manually locked in a desired location within the mixed reality environment. These embodiments are particularly useful in the production of crowns, restored teeth, or reconstructed teeth. Practitioners/dental labs shaping the physical crown, restored tooth, or reconstructed tooth can have a virtual representation of it rendered within the mixed reality environment and "lock" the virtual representation in place in the practitioner's physical workspace. Thus, the virtual crown, restored tooth, or reconstructed tooth can be overlaid on or at least observable in the same field of view as the potential restoration, material that is to be fashioned into the physical crown, tooth to be restored or reconstructed, or a representative physical model of the potential restoration, as it is being shaped or previewed for treatment planning and/or fabrication. In each case, it easier for practitioners to follow the template represented by the virtual crown, restored tooth, or reconstructed tooth and produce a more accurate physical representation.

Referring again to FIGS. 1A-1B, in some embodiments, computer programs 108 include software 116 for identifying an alignment between the virtual dental treatment template and the physical arch in the mixed reality device. As discussed above, rendering the virtual dental treatment template within the mixed reality device enables a practitioner to, in a single field of view, visualize the patient and the work to be done on the patient. Alignment software 116 further identifies how the virtual dental treatment template and the physical arch should align, so that the practitioner is essentially given an overlay of the work as completed on the very patient upon which the work will be performed. In some embodiments, alignment is indicated by a change in color of the virtual dental treatment template. In some embodiments, alignment is indicated by a feedback to the practitioner, e.g., auditory, haptic, visual, etc. In some embodiments, the alignment of the virtual between the virtual dental treatment template and the physical arch is viewable by the patient. In these embodiments, the patient can preview the installation of the virtual dental treatment template and its associated aesthetic features, e.g., clear versus metal brackets; various colors of elastomeric ties; alignment trays; restorative options, e.g., crowns, restored tooth, replacement tooth, upper and/or lower jaw movement, etc.; alveolar ridge augmentation; or a combination thereof, before installation.

Figure 5A:
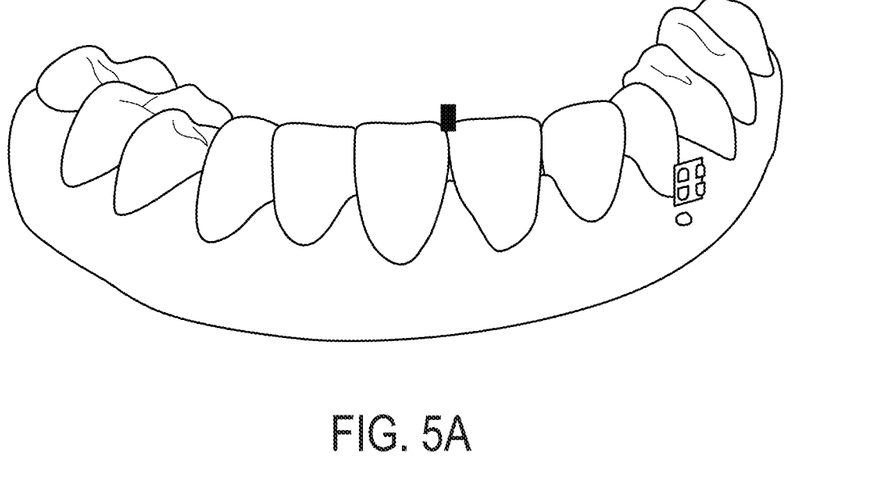
FIGS. 5A and 5B portray virtual guides according to some embodiments of the present disclosure.
Figure 5B:
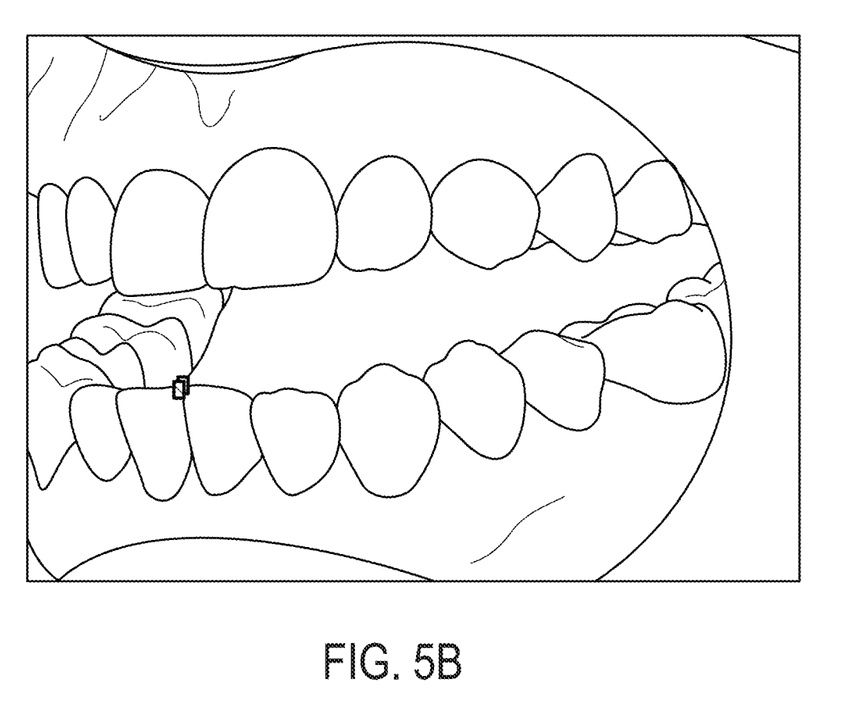

Referring now to FIG. 1A, in some embodiments, alignment of virtual dental template and physical arch identifying software 116 includes software 116A for attaching a first virtual guide to the virtual arch. In some embodiments, alignment identifying software 116 includes software 116B for attaching a second virtual guide to the physical arch in the mixed reality device. With the first virtual guide and the second virtual guide attached to the same position on the virtual arch and the physical arch, the virtual dental treatment template can thus be aligned to the physical arch by aligning the first and second virtual guides. In some embodiments, system 100 includes a physical guide 117 for positioning on the physical arch for aligning the second virtual guide with the physical arch. Exemplary embodiments of attaching first and second virtual guides are portrayed in FIGS. 5A (first virtual guide) and 5B (second virtual guide).

Figure 6:
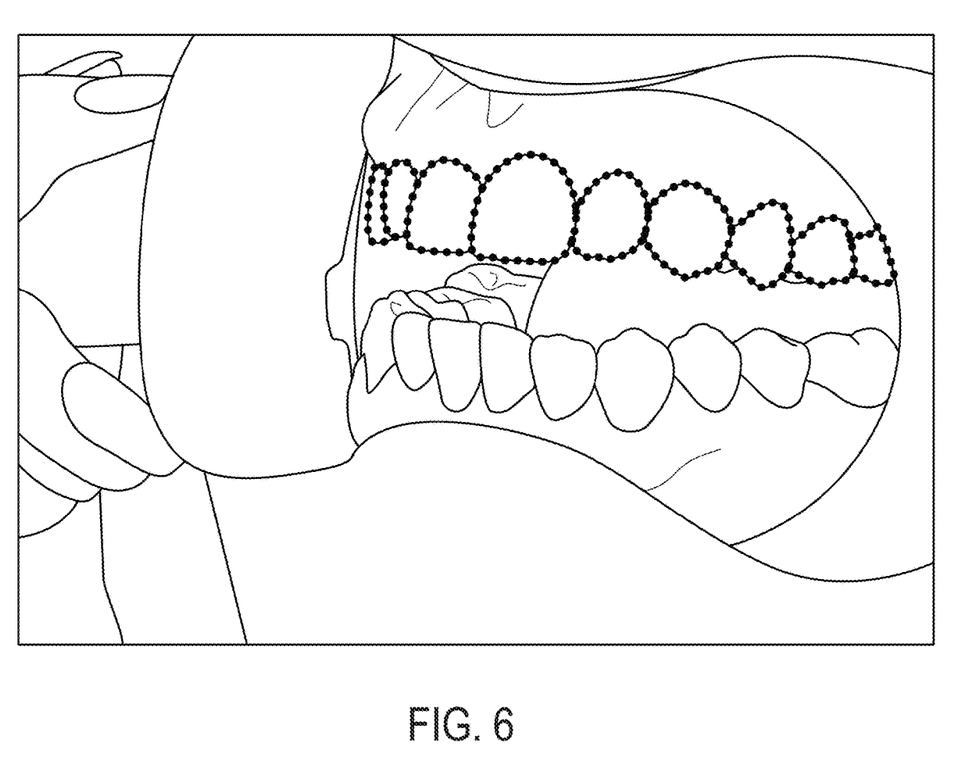
FIG. 6 portrays alignment identification according to some embodiments of the present disclosure.

Referring now to FIG. 1B, in some embodiments, alignment identifying software 116 includes software 116' for training system 100 with a landmarked training data set to identify a tooth, teeth, or arch outline, or a combination thereof. In some embodiments, alignment identifying software 116 includes software 116" for identifying a corresponding tooth outline from the virtual dental treatment template in the physical arch. In some embodiments, the landmarked training data set includes separate landmarked training data sets for arches, incisors, cuspids, bicuspids, and molars. An exemplary embodiment of identifying a tooth outline using software 116 is portrayed in FIG. 6.

Figure 7:
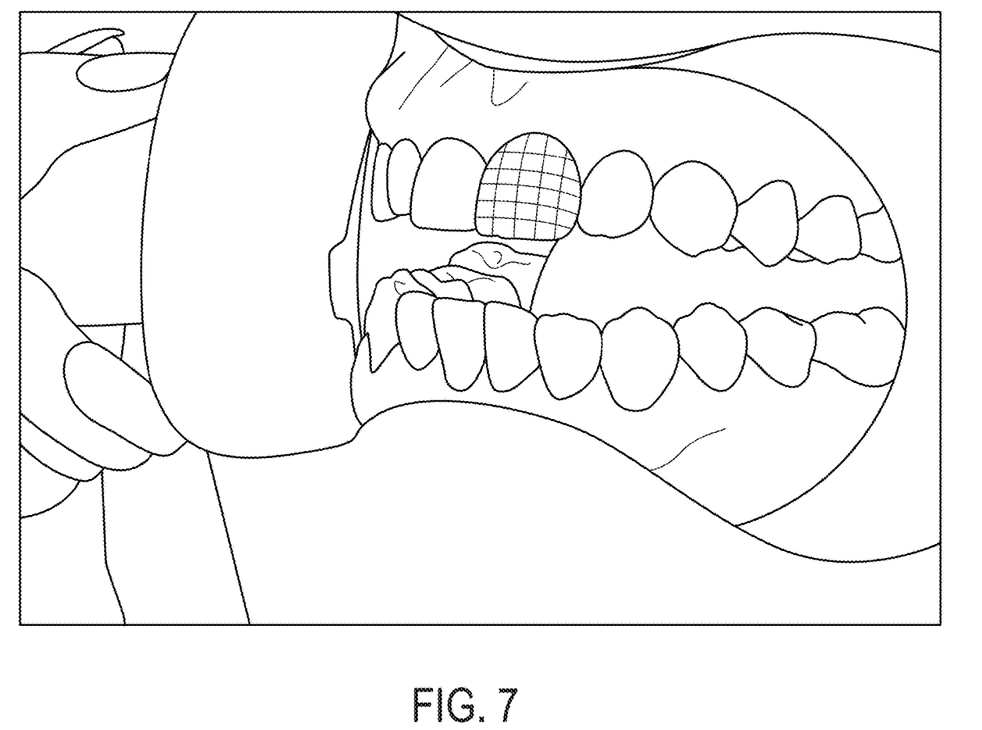
FIG. 7 portrays alignment identification according to some embodiments of the present disclosure.

Referring again to FIGS. 1A and 1B, in some embodiments, computer programs 108 include software 118 for maintaining the alignment between the virtual dental treatment template and the physical arch in the mixed reality device. Maintaining the alignment between the virtual dental treatment template and the physical arch gives both the practitioner and the patient the freedom to move or reorient themselves in physical space. Thus, a practitioner can momentarily look away to retrieve or swap out dental instruments, and the patient can move their head or body, without necessitating a realignment. An exemplary embodiment is shown in FIG. 7, where a virtual grid is overlaid on an upper incisor to provide a guide for the practitioner. Even if the practitioner moves, such as for a better viewing angle of the physical dental apparatus on the grid, the grid remains "snapped" in place and does not need to be realigned.

Referring again to FIGS. 1A-1B, in some embodiments, computer programs 108 include software 120 for identifying an alignment between a physical dental apparatus and the virtual dental apparatus from the virtual dental treatment template. In some embodiments, practitioners using system 100 will already have the advantage of viewing the virtual dental treatment template on the patient's physical arch, and thus will simply need to match the corresponding physical dental apparatus to the location of the virtual dental apparatus. Apparatus alignment software 120 further supports the practitioner by recognizing this alignment for even more precise placement of the physical dental apparatus. In some embodiments, alignment is indicated by a change in color of the virtual dental treatment template. In some embodiments, alignment is indicated by a feedback to the practitioner, e.g., auditory, haptic, visual, etc.

In some embodiments, computer programs 108 include software 122 for rendering the patient's face with the virtual dental apparatus on the computing device. In some embodiments, computer programs 108 include software 124 for rendering the patient's face as it would appear after dental treatment is completed. In some embodiments, intermediate phases of the patient's dental treatment are rendered. In some embodiments, the completed dental treatment and/or intermediate phase rendering is overlaid on a rendering of the patient, thus achieving a "before and after" demonstration. In these embodiments, the practitioner can simulate and show the patient aesthetic features, e.g., clear versus metal brackets; various colors of elastomeric ties; alignment trays; restorative options, e.g., crowns, restored tooth, replacement tooth, upper and/or lower jaw movement, etc.; alveolar ridge augmentation; or a combination thereof.

Figure 8:
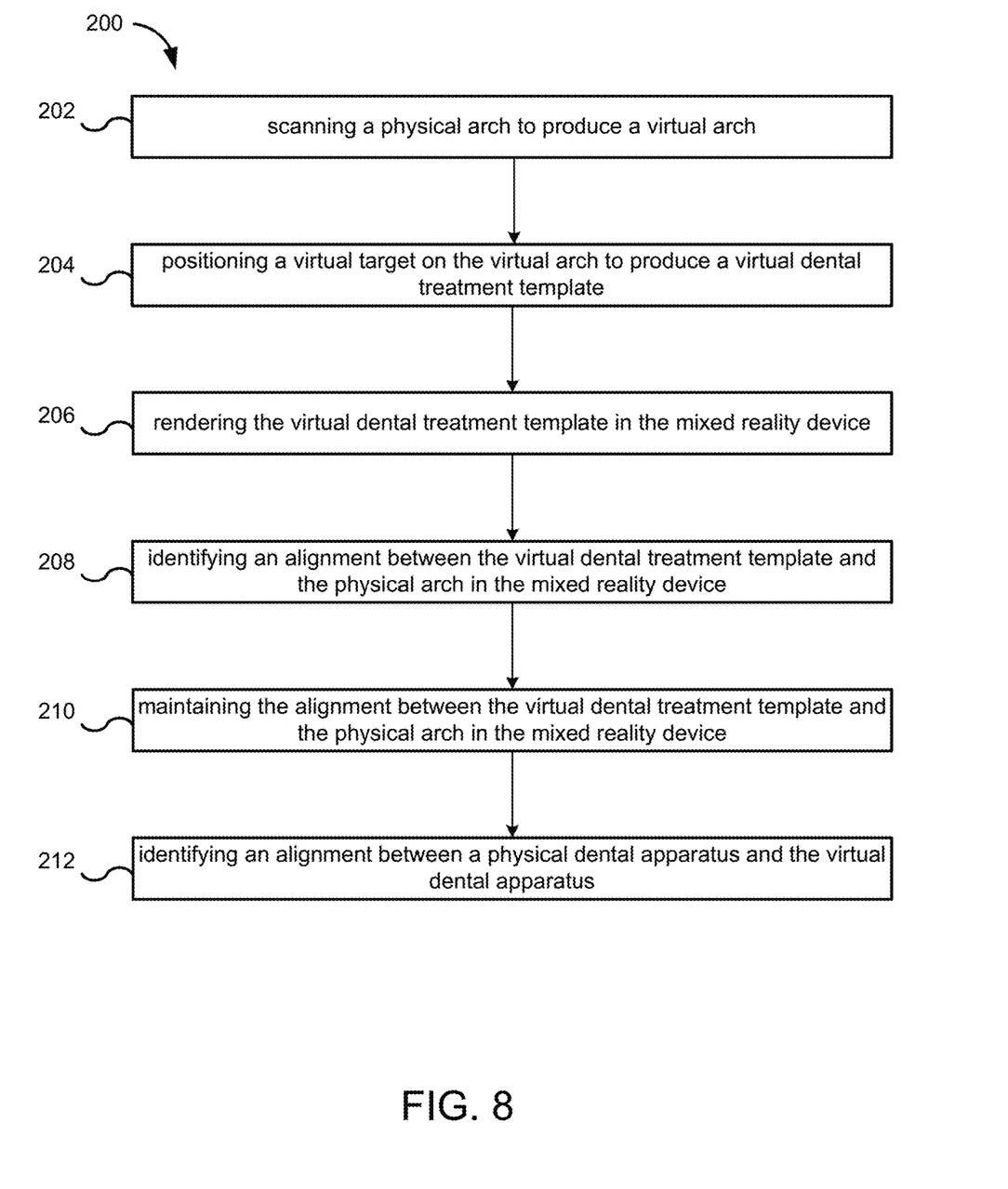
FIG. 8 is a chart of a computer implemented method for providing dental treatment according to some embodiments of the present disclosure.

Referring now to FIG. 8, aspects of the disclosed subject matter include a method 200 for providing dental treatment to a patient. At 202, a physical arch is scanned to produce a virtual arch. As discussed above, in some embodiments, the patient's entire physical arch is scanned. In some embodiments, a target portion of the patient's physical arch is scanned, e.g., the scan is limited to a single tooth, series of teeth, and/or associated anatomical structures relevant to treatment. Further, as discussed above, any suitable scanning process or device, e.g., a 3D scanner, can be used. At 204, a virtual target, e.g. a virtual dental apparatus, a grid, etc., is positioned on the virtual arch to produce a virtual dental treatment template. As was discussed above, in some embodiments, the virtual dental apparatus is positioned using a system trained to identify expected movements based on virtual dental apparatus location corresponding to the desired final position of the teeth. In some embodiments, the practitioner can make manual adjustments to the location of the virtual dental apparatus.

At 206, the virtual dental treatment template is rendered in a mixed reality device. As discussed above, in some embodiments, the practitioner can manipulate the virtual dental treatment template via, e.g., translation, rotation, or tipping. Additionally, in some embodiments, the practitioner can zoom in and out to magnify the virtual dental treatment template and/or the physical environment it occupies in order to better position a physical dental apparatus consistent with that template.

At 208, an alignment between the virtual dental treatment template and the physical arch is identified in the mixed reality device. As discussed above, in some embodiments, this alignment is aided by one or more virtual or physical guides.

At 210, the alignment between the virtual dental treatment template and the physical arch is maintained in the mixed reality device. Once the virtual arch is locked on to the physical arch, the practitioner can proceed to apply physical dental apparatus to the physical arch consistent with the template visible to them via the mixed reality device. At 212, an alignment between a physical dental apparatus and the virtual dental apparatus is identified in the mixed reality device. As discussed above, in some embodiments, auditory, haptic, or visual cues can be implemented to aid practitioners in the alignment and application of virtual arches and physical dental apparatus. By way of example, in some embodiments, the current tooth/teeth being worked on is highlighted in the mixed reality device. In some embodiments, the current virtual dental apparatus being installed is highlighted. In some embodiments, the current tooth/teeth or virtual dental apparatus blinks or changes color to indicate alignment with the physical dental apparatus.

Figure 9A:
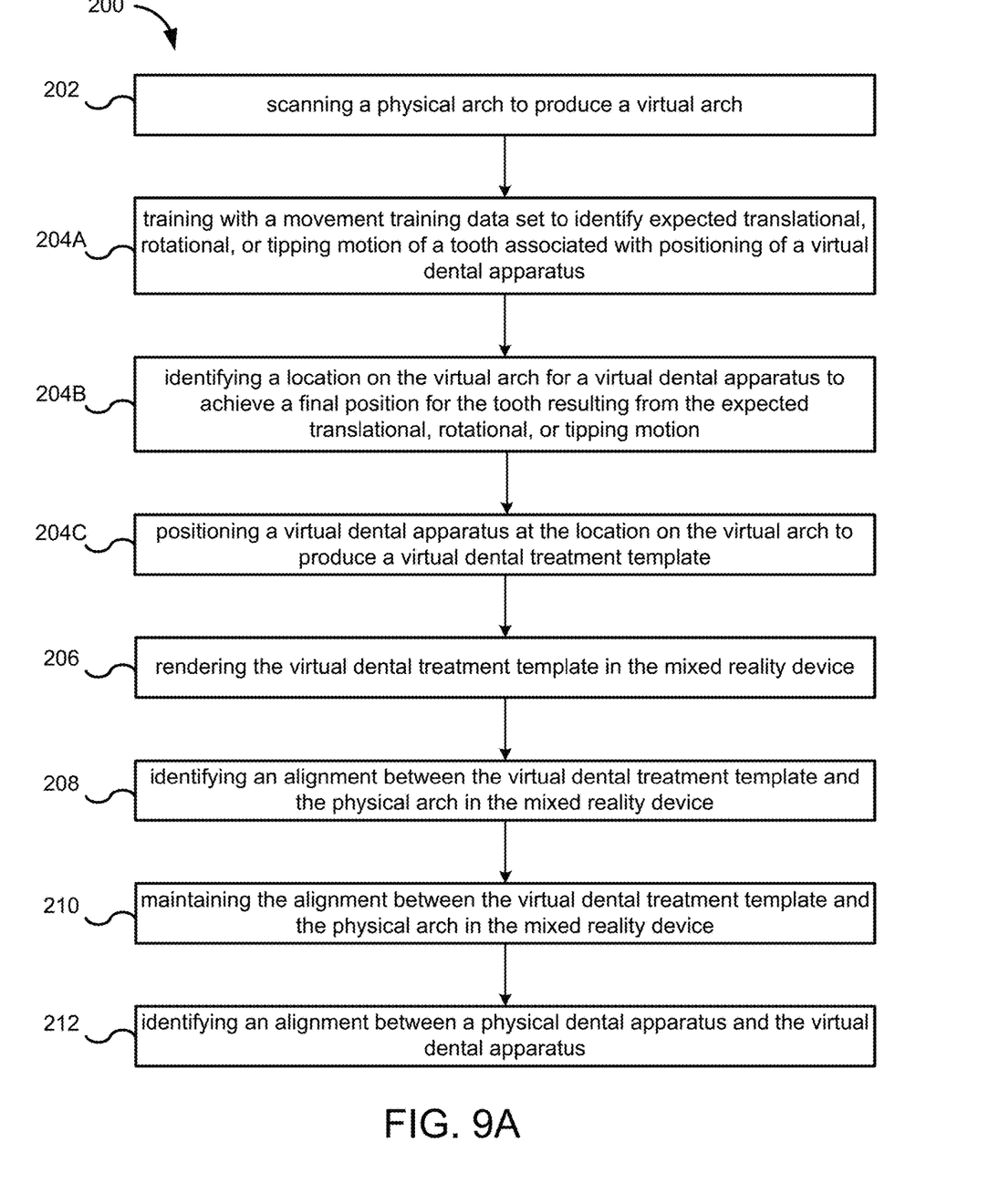
FIG. 9A is a chart of a computer implemented method for providing dental treatment according to some embodiments of the present disclosure.

Referring now to FIG. 9A, and as discussed above, at 204A, a non-transitory computer storage media coupled with a computing device and encoded with one or more computer programs is trained with a movement training data set to identify expected translational, rotational, or tipping motion of a tooth associated with positioning of a virtual dental apparatus. At 204B, a location on the virtual arch is identified for a virtual dental apparatus to achieve a final position for the tooth/teeth resulting from the expected translational, rotational, or tipping motion. At 204C, a virtual dental apparatus is positioned at the location on the virtual arch to produce a virtual dental treatment template.

Figure 9B:
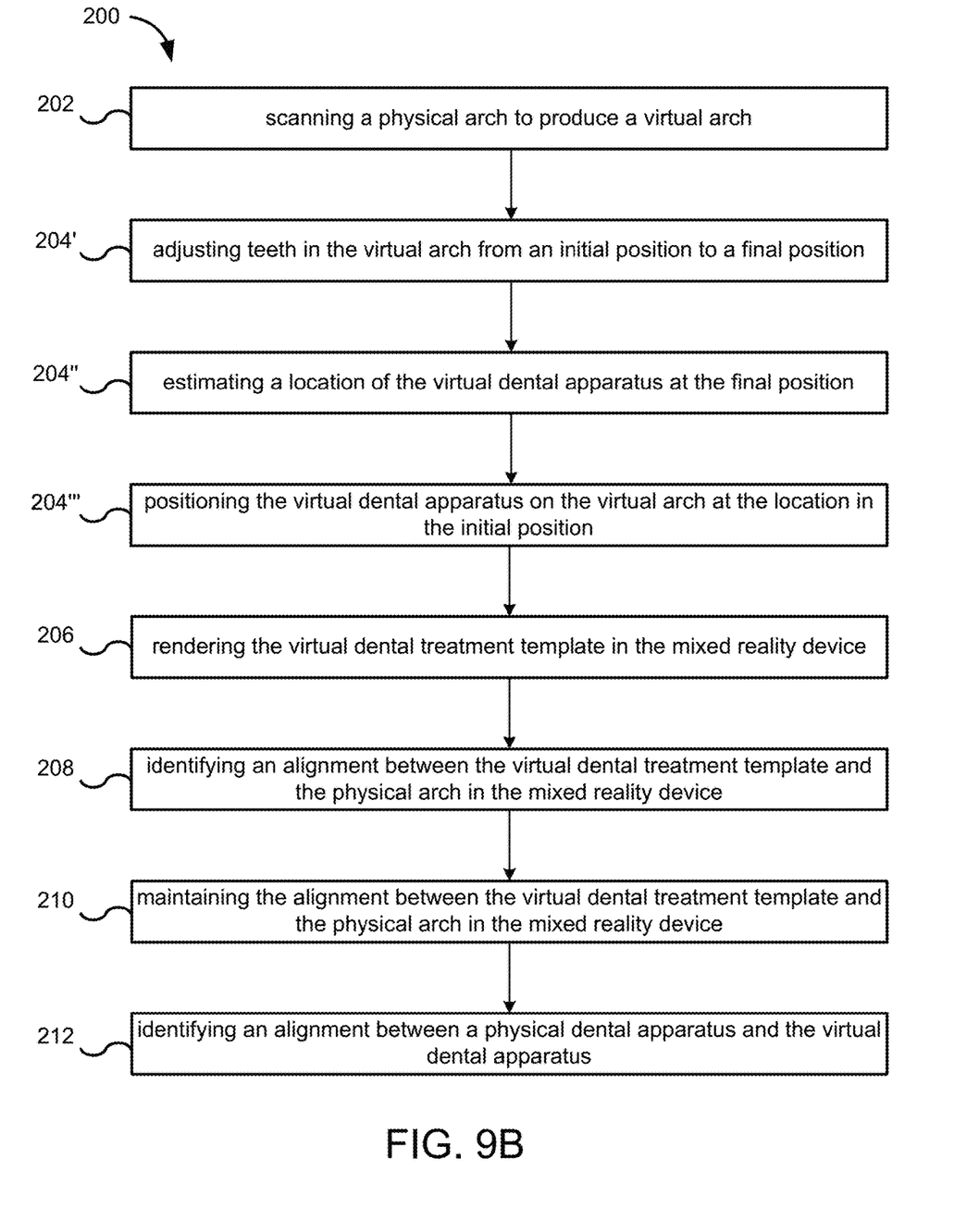
FIG. 9B is a chart of a computer implemented method for providing dental treatment according to some embodiments of the present disclosure.

Referring now to FIG. 9B, and as discussed above, at 204', one or more teeth are adjusted in the virtual arch from an initial position to a final position. At 204", a location of the virtual dental apparatus at the final position is estimated. At 204''', the virtual dental apparatus is positioned on the virtual arch at the location in the initial position.

The methods and systems of the present disclosure are advantageous in that they streamline dental treatment. Producing a dental treatment template in a virtual space removes the need for machining or casting custom molds for each patient. The system also provides tools that enable practitioners to identify optimum placement of dental apparatus more quickly and accurately. Once a dental treatment strategy is finalized, the rendering of the dental treatment strategy in mixed reality provides clear instructions to the practitioner as physical dental apparatus are installed, saving time and reducing the possibility of improper application of dental apparatus. All of these advantages together reduce the overall cost of dental treatment for the practitioner, and thus the patient. Orthodontists, general dentists, oral surgeons, and the like will be able to save time currently spent with models and analysis and repurpose it with patient interaction and dental apparatus installation. Further, because the virtual dental treatment templates enable individual dental procedures, such as the installation of braces, to be completed in a shorter amount of time, practitioners have more freedom to schedule patients, such as in the morning, where traditionally younger patients often have difficultly attending due to school and other obligations.

Finally, the system of the present disclosure enables individuals to visualize the dental apparatus prior to installation. This is useful in allowing patients to have a better understanding of their dental treatment plan, such as with the installation of crowns and bridges.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A system for providing dental treatment comprising:
   a mixed reality device;
   one or more scans of a target portion of a patient's physical arch; and
   a non-transitory computer storage media coupled with a computing device and encoded with one or more computer programs for producing a virtual dental treatment template and applying the virtual dental treatment template to the physical arch, the one or more computer programs including:
   software executing on a computer readable medium for scanning a physical arch to produce the one or more scans and a virtual arch;
   software executing on a computer readable medium for producing a virtual dental treatment template;
   software executing on a computer readable medium for rendering the virtual dental treatment template in the mixed reality device;
   software executing on a computer readable medium for aligning the virtual dental treatment template and the physical arch in the mixed reality device; and software executing on a computer readable medium for maintaining the alignment between the virtual dental treatment template and the physical arch in the mixed reality device.

2. The system according to claim 1, further comprising:
software executing on a computer readable medium for identifying an alignment between a physical dental apparatus and the a virtual dental apparatus, wherein alignment is identified by a change in color of the virtual dental treatment template, by a haptic feedback to a practitioner, by an auditory feedback to a practitioner, by a visual feedback to a practitioner, or combinations thereof.

3. The system according to claim 1, further comprising:
software executing on a computer readable medium for scanning a patient's face; and
software executing on a computer readable medium for rendering the patient's face as it would appear after dental treatment is completed.

4. The system according to claim 1, further comprising:
software executing on a computer readable medium for scanning a patient's face; and
software executing on a computer readable medium for rendering the patient's face with a virtual dental apparatus on the computing device.

5. The system according to claim 1, wherein the virtual dental treatment template includes one or more virtual dental apparatus including a bracket, implant, reconstructed tooth, replacement tooth, alveolar ridge augmentation, alignment tray, aesthetic restoration, or a combination thereof.

6. The system according to claim 5, wherein the software executing on a computer readable medium for producing a virtual dental treatment template further comprises:
software executing on a computer readable medium for training the system with a movement training data set to identify expected translational, rotational, or tipping motion of a tooth associated with positioning of the virtual dental apparatus; and
software executing on a computer readable medium for identifying a location on the virtual arch for a virtual dental apparatus to achieve a final position for the tooth.

7. The system according to claim 6, wherein the movement training data set includes separate data sets for arches, incisors, cuspids, bicuspids, and molars.

8. The system according to claim 1, further comprising a physical guide for positioning on the physical arch for aligning the virtual dental treatment template with the physical arch in the mixed reality device.

9. The system according to claim 1, wherein the software executing on a computer readable medium for aligning the virtual dental treatment template and the physical arch in the mixed reality device further comprises:
software executing on a computer readable medium for training the system with a landmarked training data set to identify a tooth, teeth, or arch outline; and
software executing on a computer readable medium for identifying a corresponding tooth outline between the virtual dental treatment template and the physical arch.

10. The system according to claim 9, wherein the landmarked training data set includes separate landmarked training data sets for arches, incisors, cuspids, bicuspids, and molars.

11. The system according to claim 1, wherein the software executing on a computer readable medium for producing a virtual dental treatment template further comprises:
software executing on a computer readable medium for applying a virtual wire through one or more brackets on the virtual arch to confirm proper bracket positioning.

12. The system according to claim 1, wherein the software executing on a computer readable medium for positioning a virtual target on the virtual arch te producing a virtual dental treatment template further comprises:
software executing on a computer readable medium for adjusting teeth in the virtual arch to a final position;
software executing on a computer readable medium for estimating a location of the virtual target at the final position; and
software executing on a computer readable medium for positioning the virtual target on the virtual arch at the location.

13. The system according to claim 12, further comprising software executing on a computer readable medium for manually adjusting the location of the virtual target.

14. The system according to claim 1, wherein the virtual dental treatment template includes one or more aesthetic features including color changes to the patient's physical arch.

15. A method for providing dental treatment comprising:
scanning a physical arch to produce a virtual arch;
producing a virtual dental treatment template;
rendering the virtual dental treatment template in a mixed reality device;
aligning the virtual dental treatment template and the physical arch in the mixed reality device; and
maintaining the alignment between the virtual dental treatment template and the physical arch in the mixed reality device.

16. The method according to claim 15, further comprising identifying an alignment between a physical dental apparatus and a virtual dental apparatus.

17. The method according to claim 15, further comprising manipulating a field of view of the mixed reality device, the field of view including at least a portion of the virtual dental treatment template aligned with the physical arch.

18. The method according to claim 15, wherein the virtual dental treatment template is rendered translucent.

19. The method according to claim 15, wherein the virtual dental treatment template includes one or more aesthetic features including color changes to the patient's physical arch.

* * * * *